Patented May 21, 1935

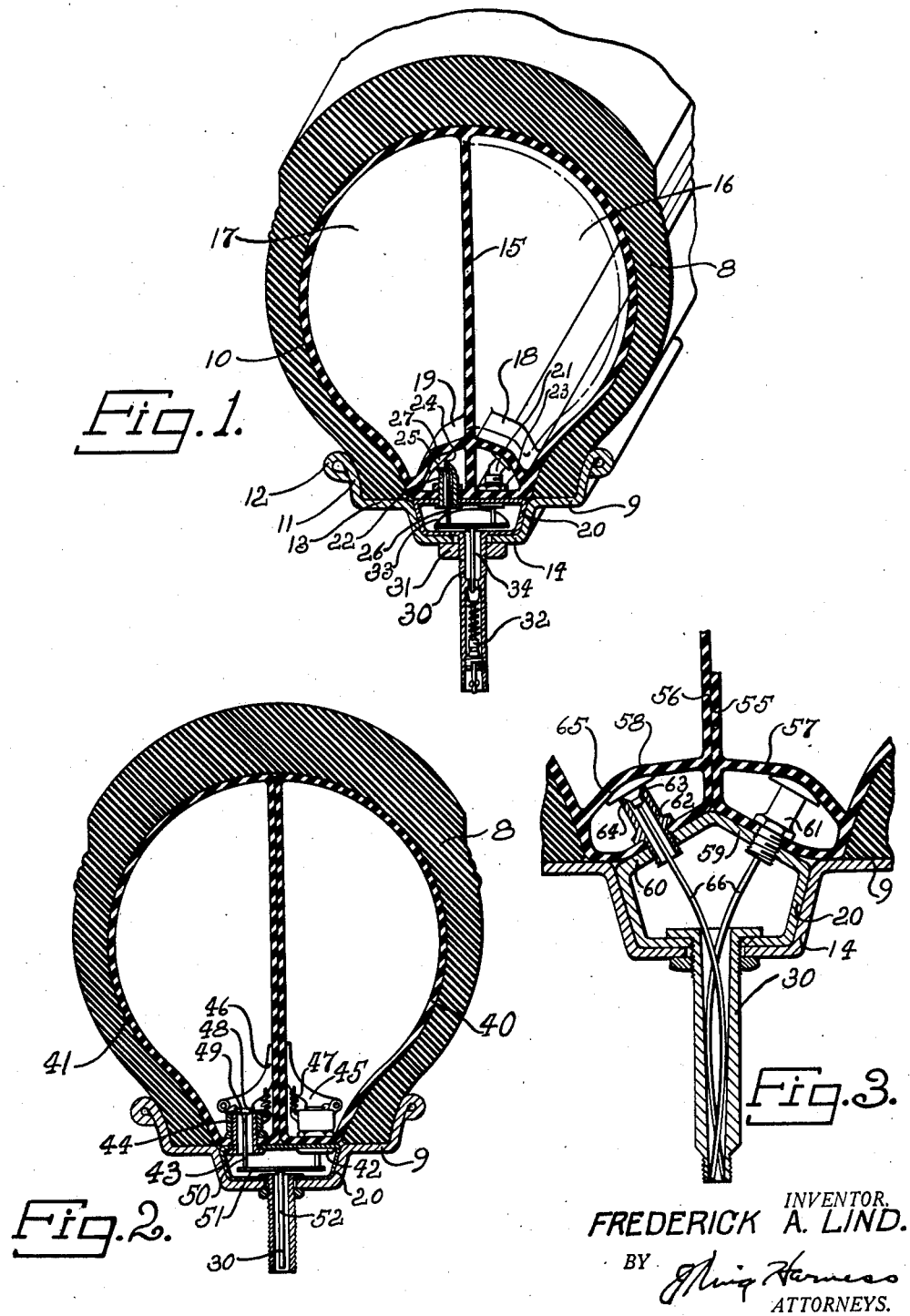

2,002,270

UNITED STATES PATENT OFFICE 2,002,270

VALVE MECHANISM

Frederick A. Lind, Detroit, Mich., assignor to Chrysler Corporation, Detroit, Mich., a corporation of Delaware Application July 3, 1933, Serial No. 678,918

18 Claims. (Cl. 152—22)

My invention relates to valve means for use with fluid containers and it has particular relation to valves for use on pneumatic automobile tires. More specifically, my invention relates to valve mechanism for use in automobile tires employing a plurality of inner tubes in a single tire casing.

Heretofore, it has been customary to employ a single inner tube in each tire casing of an automobile. With a single tube in each tire casing it is apparent that when the inner tube becomes punctured the vehicle becomes useless and must be driven slowly to the nearest curb or parking space, the wheel raised by means of a jack, and the punctured tire replaced with an inflated tire. As punctures frequently occur at inopportune times or inconvenient places, and always cause considerable loss of time, such arrangement is accompanied by considerable inconvenience.

Also, if a blow-out of the inner tube occurs when the automobile is traveling at a high rate of speed, considerable danger is incurred as the car frequently becomes unmanageable before it can be brought to a stop. As the use of smaller wheels and tires of larger cross section becomes more prevalent this danger increases as, with one tire flat due to a blow-out, one of a pair of wheels which are normally of the same diameter may suddenly have an effective diameter of only fifty percent of that of the other wheels, with consequent suddenly imposed steering difficulties.

Some attempts have been made to remedy this condition by placing more than one inner tube in a tire casing. In those instances where the tubes are in open communication with each other a puncture or blow-out in one tube immediately causes deflation of the second tube, so that no benefit results therefrom. When the tubes are independent of each other and have independent valves it is impossible to determine how much air is in one tube and how much in the other because both will indicate the same pressure at all times. If one tube leaks slightly and an equal amount of air is from time to time inserted in each, in a short time substantially all of the air will be in one tube and practically none in the other tube, but the pressure readings of both will be the same. If, under these conditions, the tube having the larger quantity of air becomes punctured or blows out, the tire will become just as flat as if a single tube were employed therein. The only way to insure an equal volume of air in each tube in tires of this character is to deflate one tube completely, inflate the other tube to approximately one-third of the ultimately desired pressure, then insert sufficient air in the other tube to bring the pressure thereof up to the desired amount. However, this requires time and so much trouble that very few people are willing to do this.

By my invention all of the advantages of properly inflated double tube tires are secured with none of the heretofore attendant disadvantages, and with the same ease and simplicity of inflation as are now enjoyed by the use of single tube tires.

One object of my invention is to provide a single and inexpensive valve mechanism whereby air is distributed from a common source to the several inner tubes in accordance with the volume contained therein.

Another object of my invention consists in providing a novel type of valve mechanism which permits the use of a single valve stem for inflating a plurality of inner tubes and which automatically distributes the air admitted therethrough between the several tubes so that each will have the same total volume of air.

A further object of my invention is to provide means whereby the position of the walls of the several inner tubes determines the relative amounts of air delivered to the several tubes from a common source.

An additional object of my invention consists in providing means whereby air is distributed to a plurality of air tubes from a common source in proportion to their needs and in which the sealing pressure on the air valve of one tube is increased when the volume of air in the other tube decreases.

For a better understanding of my invention, reference may now be had to the accompanying drawing, of which:

Fig. 1 is a cross-sectional view of a vehicle tire and tube provided with a valve mechanism constructed in accordance with my invention.

Fig. 2 is a similar view of another form which my invention may assume.

Fig. 3 is a fragmentary view of a tire and tube provided with a valve mechanism embodying a third form of my invention.

In the structure illustrated, I have shown a tire casing 8, mounted on a metallic tire rim 9 of the drop center variety, and enveloping a two-part inner tube 10. The rim consists of two spaced annular flanges 11, the edges of which are rolled, as illustrated at 12. Integral with the flanges 11 are two cylindrical surfaces 13 on which the beads of the tire casing rest and which are connected together by an annular integral depressed portion 14.

The inner tube 10, which is composed of rubber, is provided with an annular integral flexible wall or diaphragm 15, composed of rubber, connected at its peripheral edge to the inner surface of the wall of the tube adjacent the center of the tread of the casing and connected at its inner edge to the wall of the tube at the center of the rim. This wall 15 divides the tube 12 into two chambers 16 and 17 of equal shape and size. At one point on its periphery the tube 10 is provided, adjacent the rim 9 with two short bands of rubber 18 and 19, one on each side of the wall 15, each of which is connected at one end to the wall 15 at a point removed from its union with the side wall of the tube and at its other end to the wall of the tube at a point removed from its point of union with the diaphragm 15. The bands 18 and 19 are not sealed to the walls of the tube at their sides so that the space between them and the junction of the tube wall and the diaphragm 15 is in open communication with the remainder of the chamber in which they are disposed. The lengths of the bands 18 and 19 are equal and are such that they are both under equal tension when the tube is inflated properly with the diaphragm 15 midway between the side walls of the tube.

The valve mechanism comprises a box or container 20, preferably composed of metal, which fits into the depressed portion 14 of the rim 9 and the upper face of which flatly engages the tube 10 on both sides of the diaphragm 15. The valve box 20 is provided with two valve stems 21 and 22, each of which extends through the upper wall thereof and both of which are in open communication with the interior of the box. The valve stems 21 and 22 are each welded at their inner ends to the upper surface of the box 20, or otherwise rigidly secured thereto in sealing engagement. The valve stems 21 and 22 project through small openings in the wall of the tube 10 into the tube chambers 16 and 17 respectively at points beneath the bands 18 and 19 and have their outer ends bent or curved in opposite directions. The outer surface of the valve stems is threaded and provided with nuts 23 by means of which the rubber walls immediately surrounding the valve stems may be clamped to the upper surface of the valve box 20 and sealed thereto. Thus the interior of the valve box 20 is connected in communication with both sides of the double tube.

The open end of each of the valve stems 21 and 22 is provided with a valve seat 24 and with a cooperating valve closing member 25 adapted to seat thereagainst in sealing engagement. The valve closing member is mounted on the end of a relatively stiff flexible wire 26 which extends through the valve stem and into the valve box 20. On the opposite side of the valve closing member 25 is mounted a head member 27 having a curved outer surface which engages the rubber band 18 or 19, as the case may be. The tension in the bands 18 and 19 retains the valve closing members 25 on their seats. The curved outer surface of the heads 27 prevents injury to the bands 18 and 19.

From the structure thus far described, it is apparent that when air under pressure is forced into the valve box 20 it will pass through one or both of the valve stems 22 and 23 into its respective tube compartment. If the air entering the tube is equally divided between the two chambers 16 and 17 the tension of the two bands 18 and 19 will remain the same and the two valves will open equal amounts. However, if one chamber of the tube should receive or have more air than the other chamber the diaphragm 15 will immediately be flexed towards the side having the smaller volume of air. Thus if compartment 16 should have or receive more air than compartment 17 the diaphragm will immediately move towards compartment 17, thus decreasing the tension on band 19 and increasing the tension on band 18. As the pressure tending to seal valve stem 21 is then greater than the pressure tending to seal valve stem 22, more air will pass from the valve box 20 through valve stem 22 into chamber 17 than through valve stem 21 into chamber 16 and this condition will continue until the diaphragm 15 is restored to its central position, which occurs only when the chambers 16 and 17 contain equal volumes of air, when the tension on the members 18 and 19 will again be equal. Because of the flexibility of the diaphragm 15 the pressure in both tube compartments will at all times be equal and the position of the diaphragm will depend entirely on the relative volumes of air in the two compartments.

From the foregoing description it will be apparent that as air is forced into the valve box it will pass into the chamber having the smaller volume of air and will continue to do so until the two volumes are equal, after which any additional air inserted will be divided equally between the two compartments. Also that, if a leak or puncture occurs in either compartment the resultant movement of the diaphragm 15 will exert an increased pressure tending to seal the valve of the other compartment.

The valve box 20 is also provided with a valve stem 30 which is rigidly secured and sealed thereto in any desired manner, as by welding. The valve stem extends through an opening in the rim 9 in the usual manner and is threaded on its exterior for the reception of the usual valve stem cap (not shown) and locking nut 31. The interior of the valve stem 30 is threaded for the reception of the usual valve stem core 32. Disposed within the valve box 20 is a metal disc 33 provided with a stem 34 which extends into the valve stem 30. The valve stem 30 serves as a connection for the usual air hose when it is desired to inflate the tube. When it is desired to deflate the tube, as is necessary when it is desired to remove the tire from the rim to repair a puncture in the tube, the valve core 32 is depressed in the usual manner. This movement of the valve core permits the free passage of air through the valve stem 30 in the usual manner and also engages the stem 34 of the disc 33 and moves it towards the tube. The disc 33 in turn engages the stems 26 of the valves in the valve stems 21 and 26 and through them moves the valve closing members away from their seats against the tension of the elastic bands 18 and 19. The stem 34 is relatively rigid, and insures that the movement of the disc 33 be parallel to the valve stem 30, so that both of the valves guarding the chambers 16 and 17 will be lifted from their seats regardless of the relative pressures in the two chambers.

By this means a single valve stem may be used to inflate both compartments of the tube, in such manner that the air will automatically pass to the compartment having the smaller volume of air until the volumes are equal, after which the air will be equally divided between the two compartments. In this embodiment of my invention both the elasticity of the inner tube and the position occupied by the diaphragm are employed to properly regulate the pressure tending to close the several valves in proportion to the volume of air contained in the chambers which they serve.

The valve box 20 may be made in two sections which are welded together after the disc 33, with its stem 34, has been properly disposed therein. Likewise, if the divided tube is of the type made on a straight mandrel it may be assembled in the following manner: First vulcanize the bands or strips 18 and 19 into position at a point near one open end of the tube. Then insert the valve stems 21 and 22 through openings in the tube and tighten the nuts 23 to secure a sealing engagement with the box 20. Flex the bands 18 and 19 sufficiently to permit the introduction of the valve closing members 25 with their stems 26 and heads 27. Then vulcanize the two ends of the tube together, taking care that the two compartments be properly sealed from each other.

In the structure illustrated in Fig. 2, two separate and independent inner tubes 40 and 41 are disposed within the casing 8. These tubes are of similar size and shape so that when provided with equal volumes of air the two adjacent walls thereof will extend vertically from the valve box 20 to the center of the tread of the tire. In this structure two vertically disposed valve stems 42 and 43 are connected in open communication with the interior of the valve box 20, as described in connection with Fig. 1. The upper end of each of the valve stems is threaded and mounted on each of them in threaded engagement is a collar 44. Pivotally secured to the collar 44 is an arm 45, the upper end 46 of which is adapted to lie in contact with the contacting walls of the two tubes. A spring 47 is connected to an intermediate portion of the arm 45 and to a portion of the collar 44, thus tending to draw the arm 45 toward the valve stem. The upper end of the valve stem is provided with a valve seat 48 which is adapted to be engaged by a valve closing member 49 which is provided on its lower side with a valve stem 50. The upper surface of the valve closing member 49 is adapted to be engaged by the arm 45 to force the member 49 into sealing engagement with the seat 48. The collar 44 is secured to the valve stem 43 in such position that the end 46 of the arm 45 engages the contacting walls of the two tubes. Disposed within the valve box 20 is a disc 51, to the lower side of which is secured a stem 52. The stem 52 is adapted to receive the customary inflating air hose to conduct the air therefrom into the valve box 20 from which it passes through the valve stems 42 and 43 into the tubes 40 and 41, the air being divided in accordance with the volume of air in the individual tubes, as indicated by the position of the walls thereof which are in contact with each other, in the manner identical with that described in connection with Fig. 1.

The structure illustrated in Fig. 3 is quite similar to that illustrated in Fig. 1 except that two independent tubes 55 and 56 are employed. These tubes are each provided with short bands 57 and 58 similar to the bands 18 and 19 of Fig. 1. The valve box 20 is disposed in the annular recess 14 of the rim 9. The upper surface of the valve box comprises two angularly disposed surfaces 59 and 60 to which straight valve stems 61 and 62 are secured. Each of these valve stems is provided with a seat 63 adapted to be engaged by a valve closing member 64, the outer surface of which is rounded, as indicated at 65, and the inner surface of which is provided with a relatively stiff flexible stem 66 which extends through the valve box 20 and into the valve stem 30 by which the two tubes are inflated. Air is admitted to the valve box 20 and thus to the tubes 55 and 56 through the valve stem 30 in the usual manner. When it is desired to deflate the tires a suitable member is inserted in the end of the valve stem 30 so as to engage the stems 66, thus forcing the valve closing members 64 away from their seats 63 and permitting deflation of both tubes simultaneously.

It will be observed that in Figs. 2 and 3 no valve core is disposed within the valve stem 30 as each of the tubes is independently sealed therefrom although, if desired, a core of this type may be employed, as shown in Fig. 1.

Although I have described several forms which my invention may assume it will be apparent to those skilled in the art that it is not so limited but that various modifications and changes may be effected therein without departing from the spirit of my invention or from the scope of the appended claims.

What I claim is:

1. A container, a plurality of independent annular air containing cells disposed within said container in side-by-side relationship, and means controlling the admission of air to said cells so as to equalize the volumes of air in the several cells.

2. A pneumatic tire comprising an outer casing, a plurality of similar annular independent air containing cells disposed within said casing in side-by-side relationship, and means for admitting air to the several cells from a common source and for equalizing the volumes of air contained in the several cells.

3. A pneumatic tire comprising an outer casing, a plurality of air containers disposed within said casing, and an inflating valve mechanism connected to each of said containers and adapted to distribute air forced therethrough into the various air containers in inverse proportion to the relative volumes of air contained in each.

4. A pneumatic tire comprising an outer casing, means disposed within said casing comprising a plurality of individual air chambers, means for admitting air to said several air chambers from a single source, and means for automatically directing the air being admitted to the chamber containing the smallest volume of air until the volumes are equalized and then distributing the air equally to the several chambers.

5. A pneumatic tire comprising an outer casing, means disposed within said casing comprising a plurality of individual air chambers, means for admitting air to said several air chambers from a single source, and means for directing the air being admitted to the chamber containing the smallest volume of air, said means being controlled by the volume of air in the individual chambers.

6. A pneumatic tire comprising an outer casing, means disposed within the casing comprising a plurality of individual air chambers formed by flexible walls, means for admitting air to said several air chambers from a single source, and means for directing the air being admitted to the chamber containing the smallest volume of air, said means being controlled by the tension in the flexible walls of the chamber.

7. A pneumatic tire comprising an outer casing, means disposed within the casing comprising a plurality of individual air chambers formed by flexible walls, means for admitting air to said several air chambers from a single source, and means for directing the air being admitted to the chamber containing the smallest volume of air, said means being controlled by the position occupied by the flexible walls of the individual chambers.

8. A pneumatic tire comprising an outer casing, an inner tube within said casing, said tube being provided with an annular flexible partition wall dividing said tube into two similar annular air chambers, an air passageway connected to both of said chambers for admitting air thereto, and valve means adapted to direct the air being admitted to the passageway to the chamber containing the smaller volume of air.

9. A pneumatic tire comprising an outer casing, an inner tube within said casing, said tube being provided with an annular flexible partition wall dividing said tube into two similar annular air chambers, an air passageway connected to both of said chambers for admitting compressed air thereto, and valve means adapted to direct the air being admitted to the passageway to the chamber containing the smaller volume of air, said means being controlled by the tension in said partition wall.

10. A pneumatic tire comprising an outer casing, means disposed within the casing comprising a plurality of individual air chambers formed by flexible walls, means for admitting air to said several air chambers from a single source comprising an air passageway provided with a branch extending to each of the individual air chambers, an air valve for each of said branches, and means exerting a pressure on each of said valves tending to resist the passage of air therethrough, the pressures on the individual valves being of the same relative ratios as the relative volumes of air contained in the chambers to which they are connected.

11. A pneumatic tire comprising an outer casing, means disposed within the casing comprising a plurality of individual air chambers formed by flexible walls, means for admitting air to said several air chambers from a single source comprising an air passageway provided with a branch extending to each of the individual air chambers, an air valve for each of said branches, means exerting a pressure on each of said valves tending to resist the passage of air therethrough, the pressures on the individual valves being of the same relative ratios as the relative volumes of air contained in the chambers to which they are connected, and means for deflating all of said chambers simultaneously.

12. A pneumatic tire comprising an outer casing, means disposed within the casing comprising a plurality of individual air chambers formed by flexible walls, means for admitting air to said several air chambers from a single source comprising an air passageway provided with a branch extending to each of the individual air chambers, an air valve for each of said branches, means exerting a pressure on each of said valves tending to resist the passage of air therethrough, said means being adapted to increase the pressure on the valves connected to the remaining air chambers when one of said chambers loses a portion of its volume of air.

13. A pneumatic tire comprising an outer casing, means disposed within said casing providing two substantially similar annular air chambers disposed in side by side relationship, an air passageway communicating with each of said chambers and connected to a common air chamber, individual valves for each of said passageways adapted to resist the passage of air therethrough, and means for exerting pressures on said valves individually, said means being adapted to exert a greater pressure on the valve in the passageway communicating with the chamber containing the greater volume of air.

14. A pneumatic tire comprising an outer casing, a flexible inner tube disposed in said casing, said tube being provided with a flexible annular partition wall dividing said tube into two substantially similar annular air chambers, an air tube communicating with each of said chambers at a point adjacent the juncture of the tube and the partition wall, valve means in each of said air tubes, and means associated with each of said valve means and with the partition wall whereby the actuation of said valve means is determined by the position occupied by said partition wall, and an air passageway in open communication with both of said air tubes.

15. A pneumatic tire comprising an outer casing, a flexible inner tube disposed in said casing, said tube being provided with a flexible annular partition wall dividing said tube into two substantially similar annular air chambers, an air tube communicating with each of said chambers at a point adjacent the juncture of the tube and the partition wall, valve members adapted to seat on the end of each of said air tubes, flexible members each secured at one end to said wall at a point spaced from said tube and at its other to said tube at a point spaced from said wall and engaging said valve member at a point intermediate its ends, and an air passageway connected to both of said air tubes.

16. A pneumatic tire comprising an outer casing, a flexible inner tube disposed in said casing, said tube being provided with a flexible annular partition wall dividing said tube into two substantially similar annular air chambers, an air tube communicating with each of said chambers at a point adjacent the juncture of the tube and the partition wall, valve members adapted to seat on the end of each of said air tubes, flexible members each secured at one end to said wall at a point spaced from said tube and at its other to said tube at a point spaced from said wall and engaging said valve member at a point intermediate its ends, the lengths of said flexible members being such that a pressure is exerted thereby on the valve member when the partition wall occupies a position midway between the side walls of the inner tube, and an air passageway connected to both of said air tubes.

17. A pneumatic tire comprising an outer casing, a flexible inner tube disposed in said casing, said tube being provided with a flexible annular partition wall dividing said tube into two substantially similar annular air chambers, an air tube communicating with each of said chambers at a point adjacent the juncture of the tube and the partition wall, valve members adapted to seat on the end of each of said air tubes, flexible members each secured at one end to said wall at a point spaced from said tube and at its other to said tube at a point spaced from said wall and engaging said valve member at a point intermediate its ends, the lengths of said flexible members being such that a pressure is exerted thereby on the valve member when the partition wall occupies a position midway between the side walls of the inner tube, an air passageway connected to both of said air tubes, and means for raising both of said valves from their seats simultaneously.

18. A pneumatic vehicle tire comprising an outer casing, a plurality of inner tubes disposed within said casing, and valve means associated with each of said inner tubes adapted to admit air thereto from a single source, said valve means being adapted to admit air only to the tube or tubes containing the smallest volume of air until said tubes contain equal volumes and thereafter admitting air to all of said tubes in equal volume.

FREDERICK A. LIND.